(12) United States Patent
Kim et al.

(10) Patent No.: US 9,548,517 B2
(45) Date of Patent: Jan. 17, 2017

(54) BATTERY CELL OF STAIR-LIKE STRUCTURE

(71) Applicant: LG Chem, Ltd., Seoul (KR)

(72) Inventors: Young Hun Kim, Daejeon (KR); Sungjin Kwon, Daejeon (KR); Soonho Ahn, Seoul (KR); Dong-Myung Kim, Daejon (KR); Ki Woong Kim, Daejeon (KR); Seungmin Ryu, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/053,596

(22) Filed: Feb. 25, 2016

(65) Prior Publication Data

US 2016/0181667 A1    Jun. 23, 2016

Related U.S. Application Data

(60) Division of application No. 13/845,762, filed on Mar. 18, 2013, now Pat. No. 9,300,006, which is a
(Continued)

(30) Foreign Application Priority Data

Apr. 5, 2012 (KR) .......................... 10-2012-0035303
Nov. 12, 2012 (KR) .......................... 10-2012-0127726

(51) Int. Cl.
*H01M 10/04* (2006.01)
*H01M 10/0585* (2010.01)
(Continued)

(52) U.S. Cl.
CPC ......... *H01M 10/0585* (2013.01); *H01M 2/021* (2013.01); *H01M 2/024* (2013.01);
(Continued)

(58) Field of Classification Search
CPC ................. H01M 10/0463; H01M 10/0585; H01M 2/021; H01M 2/024; H01M 2/0212; H01M 2/0217
(Continued)

(56) References Cited

U.S. PATENT DOCUMENTS 2,702,310 A  2/1955  Kaye et al.
3,442,717 A  5/1969  Horn et al.
(Continued)

FOREIGN PATENT DOCUMENTS

CN    1314008 A    9/2001
CN    1363121 A    8/2002
(Continued)

OTHER PUBLICATIONS

International Search Report for Application No. PCT/KR2013/002118 dated Jun. 28, 2013.
(Continued)

*Primary Examiner* — Karie O'Neill Apicella
(74) *Attorney, Agent, or Firm* — Lerner, David, Littenberg, Krumholz & Mentlik, LLP

(57) ABSTRACT

Disclosed herein is a battery cell configured to have a structure in which an electrode assembly including a separator disposed between a cathode and an anode is mounted in a battery case, wherein the battery case includes an upper case and a lower case, the upper case and/or the lower case being provided with a receiving part, in which the electrode assembly is mounted, the electrode assembly includes a plurality of electrodes or unit cells stacked in a height direction on the basis of a plane, two or more of the electrodes or the unit cells having different planar sizes, and the receiving part of the battery case is provided with stair-like steps corresponding to an external appearance of the electrode assembly.

8 Claims, 10 Drawing Sheets

Related U.S. Application Data continuation of application No. PCT/KR2013/002127, filed on Mar. 15, 2013.

(51) Int. Cl.
  *H01M 2/02* (2006.01)
  *H01M 2/36* (2006.01)
  *H01M 10/44* (2006.01)
  *H01M 2/08* (2006.01)
  *H01M 10/0525* (2010.01)

(52) U.S. Cl.
  CPC ....... *H01M 2/0207* (2013.01); *H01M 2/0212* (2013.01); *H01M 2/0217* (2013.01); *H01M 2/0275* (2013.01); *H01M 2/08* (2013.01); *H01M 2/361* (2013.01); *H01M 10/0436* (2013.01); *H01M 10/0463* (2013.01); *H01M 10/446* (2013.01); *H01M 10/0525* (2013.01); *H01M 2220/30* (2013.01); *Y10T 29/4911* (2015.01)

(58) Field of Classification Search
  USPC ................................ 429/152, 163; 29/623.2
  See application file for complete search history.

(56) References Cited

U.S. PATENT DOCUMENTS

| | | | |
|---|---|---|---|
| 4,092,464 A | 5/1978 | Dey et al. | |
| 4,964,877 A | 10/1990 | Keister et al. | |
| 5,633,097 A | 5/1997 | Miller | |
| 5,652,074 A | 7/1997 | Larson, III et al. | |
| 6,040,078 A | 3/2000 | Fauteux et al. | |
| 6,224,995 B1 | 5/2001 | Fauteux et al. | |
| 6,300,002 B1 | 10/2001 | Webb et al. | |
| 6,498,951 B1 | 12/2002 | Larson et al. | |
| 6,610,443 B2 | 8/2003 | Paulot et al. | |
| 6,946,220 B2 | 9/2005 | Probst et al. | |
| 7,285,334 B1 | 10/2007 | Yamashita et al. | |
| 7,479,349 B2 | 1/2009 | O'Phelan et al. | |
| 7,595,132 B2 | 9/2009 | Kang et al. | |
| 2001/0005561 A1 | 6/2001 | Yamada et al. | |
| 2002/0119367 A1 | 8/2002 | Watanabe et al. | |
| 2002/0122975 A1 | 9/2002 | Spillman et al. | |
| 2002/0160257 A1 | 10/2002 | Lee et al. | |
| 2003/0013012 A1 | 1/2003 | Ahn et al. | |
| 2003/0039883 A1 | 2/2003 | Notten et al. | |
| 2003/0077509 A1 | 4/2003 | Probst et al. | |
| 2004/0119442 A1 | 6/2004 | Lee et al. | |
| 2005/0164094 A1 | 7/2005 | Kotato et al. | |
| 2005/0214642 A1 | 9/2005 | Kim et al. | |
| 2006/0172185 A1 | 8/2006 | Mimura | |
| 2006/0269842 A1 | 11/2006 | Ichinose et al. | |
| 2006/0275661 A1 | 12/2006 | Kim et al. | |
| 2006/0286456 A1 | 12/2006 | Fu et al. | |
| 2007/0054180 A1 | 3/2007 | Miyajima et al. | |
| 2007/0059595 A1 | 3/2007 | Endo et al. | |
| 2007/0099078 A1 | 5/2007 | Zhang et al. | |
| 2007/0202401 A1 | 8/2007 | Viavattine | |
| 2007/0218355 A1 | 9/2007 | Ryu et al. | |
| 2007/0287064 A1 | 12/2007 | Suzuki et al. | |
| 2008/0137890 A1 | 6/2008 | Petersen et al. | |
| 2009/0075168 A1 | 3/2009 | Lee | |
| 2009/0123829 A1 | 5/2009 | Kim et al. | |
| 2009/0159582 A1 | 6/2009 | Chami et al. | |
| 2010/0047685 A1 | 2/2010 | Lee et al. | |
| 2010/0112451 A1 | 5/2010 | Shibutani et al. | |
| 2010/0279161 A1 | 11/2010 | Kang et al. | |
| 2010/0319187 A1 | 12/2010 | Kim et al. | |
| 2011/0052952 A1 | 3/2011 | Roh et al. | |
| 2011/0183183 A1 | 7/2011 | Grady et al. | |
| 2011/0274955 A1 | 11/2011 | Park et al. | |
| 2011/0287308 A1 | 11/2011 | Kim et al. | |
| 2012/0015223 A1 | 1/2012 | Bhardwaj et al. | |
| 2012/0015236 A1 | 1/2012 | Spare | |
| 2012/0107654 A1 | 5/2012 | Bhardwaj et al. | |
| 2012/0129037 A1 | 5/2012 | Hohenthanner et al. | |
| 2012/0135299 A1 | 5/2012 | Kwon et al. | |
| 2012/0156551 A1 | 6/2012 | Cho | |
| 2012/0183825 A1 | 7/2012 | Lee et al. | |
| 2012/0202105 A1 | 8/2012 | Shinyashiki et al. | |
| 2012/0225345 A1 | 9/2012 | Kim | |
| 2013/0019732 A1 | 1/2013 | Yotsumoto | |
| 2013/0108906 A1 | 5/2013 | Bhardwaj et al. | |
| 2013/0144167 A1 | 6/2013 | Lee et al. | |
| 2013/0344360 A1 | 12/2013 | Miyajama et al. | |
| 2014/0093762 A1 | 4/2014 | Goh et al. | |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001-028275 | 1/2001 |
| JP | 2001167743 A | 6/2001 |
| JP | 2001357892 A | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A | 7/2003 |
| JP | 2003234094 A | 8/2003 |
| JP | 2003303622 A | 10/2003 |
| JP | 2004-111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010076980 A | 8/2010 |
| JP | 2011003518 A | 1/2011 |
| JP | 2011081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 | 11/2001 |
| KR | 20030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 | 1/2009 |
| KR | 10-0884945 B1 | 2/2009 |

(56) References Cited

FOREIGN PATENT DOCUMENTS

| | | |
|---|---|---|
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 0243178 A1 | 5/2002 |
| WO | 2012/009423 A1 | 1/2012 |
| WO | 2012053772 A2 | 4/2012 |
| WO | 2013054593 A1 | 4/2013 |
| WO | 2013141279 A1 | 9/2013 |
| WO | 2013-180378 A1 | 12/2013 |

OTHER PUBLICATIONS

Inernational Search Report for Application No. PCT/KR2013/001815 dated Jun. 27, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).
Machine translation of JP 2003-234094 (Murai).
International Search Report from PCT/KR2013/002132, dated Jun. 14, 2013.
International Search Report from PCT/KR2013/002125, dated Jun. 26, 2013.
International Search Report from PCT/KR2013/002130, dated Dec. 10, 2013.
International Search Report from PCT/KR2013/002131, dated Jul. 22, 2013.
International Search Report from PCT/KR2013/002123, dated Dec. 11, 2013.
Extended Search Report from European Application No. 13797719.5, dated Feb. 12, 2016.

(a)

(b)

BATTERY CELL OF STAIR-LIKE STRUCTURE

CROSS-REFERENCE TO RELATED APPLICATION(S)

The present application is a divisional of U.S. patent application Ser. No. 13/845,762, filed Mar. 18, 2013, which is a continuation of International Application No. PCT/KR2013/002127 filed Mar. 15, 2013, which claims the benefit of the filing dates of Korean Patent Application Nos. 10-2012-0127726 filed Nov. 12, 2012, and 10-2012-0035303, filed on Apr. 5, 2012, all of the disclosures of which are hereby incorporated herein by reference.

TECHNICAL FIELD

The present invention relates to a battery cell configured to have a structure in which an electrode assembly including a separator disposed between a cathode and an anode is mounted in a battery case, wherein the battery case includes an upper case and a lower case, the upper case and/or the lower case being provided with a receiving part, in which the electrode assembly is mounted, the electrode assembly includes a plurality of electrodes or unit cells stacked in a height direction on the basis of a plane, two or more of the electrodes or the unit cells having different planar sizes, and the receiving part of the battery case is provided with stair-like steps corresponding to an external appearance of the electrode assembly.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be classified as a cylindrical battery, a prismatic battery or a pouch-shaped battery. Based on the kind of an electrolyte, a lithium secondary battery may also be classified as a lithium-ion battery, a lithium-ion polymer battery or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

Generally, a pouch-shaped battery is a battery having an electrode assembly and an electrolyte in a pouch-shaped battery case, formed of a laminate sheet including a resin layer and a metal layer, in a sealed state. The electrode assembly mounted in the battery case may be configured in a jelly-roll (wound) type structure, a stacked type structure or a combination (stacked/folded) type structure.

FIG. 1 is a view typically showing the structure of a pouch-shaped secondary battery including a stacked type electrode assembly.

Referring to FIG. 1, a pouch-shaped secondary battery 10 may be configured to have a structure in which an electrode assembly 30, including cathodes, anodes and separators disposed respectively between the cathodes and the anodes, is mounted in a pouch-shaped battery case 20 in a sealed state such that two electrode leads 40 and 41 electrically connected to cathode tabs 31 and anode tabs 32 of the electrode assembly 30 are exposed to the outside.

The battery case 20 may include a case body 21 having a depressed receiving part 23, in which the electrode assembly 30 is located, and a cover 22 integrally connected to the case body 21.

Although not shown, the battery case may include a lower case having a depressed receiving part, in which the electrode assembly is located, and an upper case covering the lower case to seal the electrode assembly.

The battery case 20 may be formed of a laminate sheet including an outer resin layer 20A constituting the outermost portion of the laminate sheet, an isolation metal layer 20B to prevent penetration of materials, and an inner resin layer 20C for sealing.

The cathode tabs 31 and the anode tabs 32 of the stacked type electrode assembly 30 may be respectively coupled to the electrode leads 40 and 41 by welding. In addition, insulative films 50 may be attached to the top and bottom of each of the electrode leads 40 and 41 to prevent the occurrence of a short circuit between a thermal welding device (not shown) and the electrode leads 40 and 41 and to achieve sealing between the electrode leads 40 and 41 and the battery case 20 when the upper end 24 of the case body 21 and the upper end of the cover 22 are thermally welded to each other using the thermal welding device.

In recent years, however, a new type of battery cell is required in accordance with a slim type design trend or various other design trends.

In addition, the above-mentioned battery cells are configured to include electrode assemblies having the same size or the same capacity. For this reason, in order to manufacture a battery cell having a novel structure in consideration of the design of a device, to which the battery cell is applied, it is necessary to reduce the capacity of the battery cell or modify the design of the device so that the size of the device is increased.

In addition, electrical connection is complicated during modification of the design of the device, and therefore, it may be difficult to manufacture a battery cell satisfying desired conditions.

Furthermore, it may also be necessary to manufacture the battery case based on the shape of the electrode assembly.

Therefore, there is a high necessity for an electrode assembly and a battery case that can be used depending upon the shape of a device, to which a battery cell is applied, and a battery cell including the same.

Technical Problem

Therefore, the present invention has been made to solve the above problems, and other technical problems that have yet to be resolved.

Specifically, it is an object of the present invention to provide a battery cell configured to have a structure in which the battery cell can be mounted in various spaces of a device, thereby maximizing utilization of the inner space of the device and also configured to have a structure in which the battery cell can be efficiently mounted in devices having various external appearances in addition to a rectangular external appearance.

It is another object of the present invention to provide an electrode assembly and a battery case having structures proper to manufacture the battery cell.

Technical Solution

In accordance with one aspect of the present invention, the above and other objects can be accomplished by the provision of a battery cell configured to have a structure in which an electrode assembly including a separator disposed between a cathode and an anode is mounted in a battery case, wherein the battery case includes an upper case and a lower case, the upper case and/or the lower case being provided with a receiving part, in which the electrode assembly is mounted, the electrode assembly includes one or more electrode assemblies or composite electrode assemblies selected from a group consisting of an electrode assembly including a plurality of electrodes or unit cells stacked in a height direction on the basis of a plane, two or more of the electrodes or the unit cells having different planar sizes, a wound type electrode assembly including two electrode rolls having different radii or major axis lengths, a composite electrode assembly configured to have a structure in which two or more wound type electrode assemblies including two electrode rolls having different radii or major axis lengths are stacked, and a stacked and folded type electrode assembly configured to have a structure in which a plurality of electrodes or unit cells is stacked in a height direction on the basis of a plane, two or more of the electrodes or the unit cells have different planar sizes, and major surfaces and at least one side surface of the electrodes and/or the unit cells are covered by a sheet type separation film, and the receiving part of the battery case is provided with stair-like steps corresponding to an external appearance of the electrode assembly.

Consequently, the battery cell according to the present invention may be manufactured so as to have various capacities and sizes based on the specific structure as described above. In a case in which the battery cell is mounted in a device, therefore, it is possible for the battery cell to be mounted in various spaces of the device, thereby maximizing utilization of inner space of the device.

In a case in which n electrode groups having different stack areas are stacked, the stair-like step structure may have n steps, where, n is a natural number equal to or greater than 2 and may be properly adjusted in consideration of the capacity of a device or the curvature of the outside of the device.

The number of electrodes and/or unit cells having different planar sizes included in the electrode assembly may be flexibly adjusted based on the shape or required capacity of a device in which the battery cell is installed. Specifically, the electrode assembly may include two or three unit cells. Alternatively, the electrode assembly may include four or more unit cells.

The electrode assembly including the plurality of electrodes or unit cells stacked in the height direction on the basis of the plane, two or more of the electrodes or the unit cells having different planar sizes, i.e. the stacked type electrode assembly, may include a first electrode group configured to have a structure in which a cathode plate or an anode plate is disposed between separator plates and the cathode plate, the anode plate, and the separator plates are laminated while being stacked such that the cathode plate or the anode plate and one of the separator plates are located at the outermost sides of the stacked type electrode assembly. In this case, the stacked type electrode assembly may include a second electrode group configured to have a structure in which a cathode plate, an anode plate, and separator plates are laminated while being stacked such that the separator plates are located at the outermost sides of the stacked type electrode assembly.

In this case, one of the separator plates may be a second separator.

For example, the first electrode group may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type electrode assembly may include a third electrode group configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode assembly.

The stacked type electrode assembly may be configured to have a structure in which only first electrode groups are stacked, a structure in which only second electrode groups are stacked, a structure in which only third electrode groups are stacked, a structure in which only fourth electrode groups are stacked, or a structure in which the first, second, third, and fourth electrode groups are combined.

The second electrode group may be stacked at the uppermost end or the lowermost end of the first electrode group.

In the structure in which only the second electrode groups are stacked, a cathode plate or an anode plate may be disposed between the second electrode groups.

A fixing member to more securely maintain the stack structure of the cathode plate, the separator plate, and the anode plate may be added to the first electrode group to the fourth electrode group.

The fixing member may be an additional external member different from the first electrode group or the second electrode group. The fixing member may be an adhesive tape or a bonding tape to cover a portion or the entirety of the outside of each electrode group.

The outside of each electrode group may include sides, a top, a front, and a rear of each electrode group.

The fixing member may be a portion of the separator plate constituting each electrode group. In this case, the ends of the separator plate may be thermally welded to fix each electrode group. However, the present invention is not limited thereto.

Ends of the separator plate may extend such that the separator plate has a length larger than the size of the cathode plate and the anode plate, i.e. the horizontal length or the vertical length. The extending ends of the separator plate may be connected to each other by thermal welding.

The fixing member may include all members that are capable of fixing the first electrode group or the second electrode group.

In a case in which the stacked type electrode assembly is configured to include the first electrode group and the second electrode group, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of the first electrode group, and therefore, it is possible to minimize expansion in volume of the stacked type electrode assembly due to swelling.

In a case in which the stacked type electrode assembly is configured to include the first electrode group and the second electrode group, misalignment of the electrode assembly caused during a folding process is prevented and omission of processing equipment is possible. In addition, it is possible to form the first electrode group or the second electrode group using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

In addition, since the electrodes or the unit cells having different sizes are vertically stacked, it is possible to increase the capacity of the battery and, at the same time, to improve utilization of a surplus space based on a compact structure.

In a concrete example, the two or more electrodes or unit cells having different planar sizes may be different from each other in terms of at least one selected from among a thickness, a breadth (horizontal length), and a width (vertical length) of each electrode or each unit cell.

The difference in size between the electrodes or the unit cells is not particularly restricted. For example, the electrodes or the unit cells may be different from each other in terms of at least one selected from among a thickness, a breadth (horizontal length), and a width (vertical length) of each electrode or each unit cell.

In a first example, upon comparison between two electrodes or unit cells, the thickness of the relatively small electrode or unit cell may be equivalent to 20% to 95%, concretely 30% to 90%, of that of the relatively large electrode or unit cell under conditions that the electrodes or the unit cells have the same breadth and width.

In a second example, upon comparison between two electrodes or unit cells, the breadth of the relatively small electrode or unit cell may be equivalent to 20% to 95%, concretely 30% to 90%, of that of the relatively large electrode or unit cell under conditions that the electrodes or the unit cells have the same thickness and width.

In a third example, upon comparison between two electrodes or unit cells, the width of the relatively small electrode or unit cell may be equivalent to 20% to 95%, concretely 30% to 90%, of that of the relatively large electrode or unit cell under conditions that the electrodes or the unit cells have the same thickness and breadth.

However, the present invention is not limited to the above examples.

In the present invention, the 'thickness' of each electrode or each unit cell means the height of each electrode or each unit cell in the direction in which the electrodes or the unit cells are stacked. In addition, the breadth (horizontal length) and the width (vertical length) of each electrode or each unit cell mean the horizontal length and the vertical length of each electrode or each unit cell in the direction perpendicular to the direction in which the electrodes or the unit cells are stacked.

In a concrete example, each of the unit cells may have different kinds of electrodes or the same kind of electrodes located at opposite sides of a structure in which one or more cathodes and one or more anodes are stacked in a state in which a separator is disposed respectively between the cathodes and the anodes.

In another example, electrode terminals of the unit cells may be electrically connected to each other.

The stacked structure of the unit cells is not particularly restricted. For example, the unit cells may be stacked such that the sizes of the unit cells are decreased from a lower part to an upper part of the electrode assembly. Consequently, it is possible to minimize a dead space as compared with a conventional structure in which battery cells having different sizes are stacked, thereby increasing a ratio of capacity to size of the battery.

The battery cell may be, for example, a pouch-shaped battery cell having an electrode assembly mounted in a pouch-shaped battery case; however, the present invention is not limited thereto.

Specifically, the pouch-shaped battery cell may be configured to have a structure in which an electrode assembly is mounted in a battery case formed of a laminate sheet comprising a metal layer and a resin layer such that the electrode assembly is connected to electrode terminals protruding outward from the battery case.

The battery case is manufactured to have sufficient flexibility and thickness to form the stair-like steps. If the thickness of the battery case is too large, the battery case may be broken due to lack of flexibility during formation of the stair-like steps. In addition, the volume and weight of the battery cell are increased. On the other hand, if the thickness of the battery case is too small, the battery case may be easily broken due to external impact. Consequently, the battery case may have a thickness of 50 to 200 µm such that the steps are formed at the battery case while the battery case exhibits proper flexibility and impact resistance.

The upper case and the lower case constituting the battery case may be separated members or a single member configured to have a structure in which one end of the upper case is connected to a corresponding end of the lower case.

The stair-like steps may be formed at the receiving part of the battery case using various methods. For example, the battery case may be inserted into a die having stair-like steps formed at the inside thereof and pressure may be applied to the battery case such that the stair-like steps are formed at the receiving part of the battery case.

In addition, an electrode assembly configured to have a structure in which electrodes or unit cells having different sizes are stacked may be inserted into the receiving part of the battery case and a vacuum may be applied into the receiving part of the battery case such that the receiving part of the battery case is shrunk and thus the stair-like steps are formed at the receiving part of the battery case.

Specifically, the electrode assembly may be configured to have a structure in which a plurality of electrodes or unit cells having different planar sizes is stacked. In addition, the electrode assembly may be a wound type electrode assembly including two electrode rolls having different radii or major axis lengths. Alternatively, the electrode assembly may be configured to have a structure in which two or more wound type electrode assemblies having different radii or major axis lengths are stacked.

The stair-like steps may be formed by placing the electrode assembly in the receiving part of the battery case and applying a vacuum into the receiving part to shrink and deform the battery case such that the battery case corresponds to the external appearance of the electrode assembly.

The vacuum application method may solve a problem of manufacturing a new battery case whenever the design of the electrode assembly is changed and restrain the occurrence of a local stress concentration phenomenon.

The receiving part of the battery case may be formed to have a sufficient size to receive the electrode assembly. For example, a portion, at which the stair-like steps are to be formed, of the receiving part of the battery case may be curved in vertical section to correspond to the shape of the stair-like steps. Consequently, it is possible to minimize the size of the receiving part shrunk when the curved portion of the receiving part comes into tight contact with the electrode assembly to remove a surplus space defined between the curved portion of the receiving part and the electrode assembly upon application of a vacuum.

In an example, the receiving part of the battery case may be formed in a hemispherical shape including a planar portion corresponding to the size of the upper end of the electrode assembly. In this case, the hemispherical portion of the receiving part may be deformed such that the stair-like steps are formed at the receiving part.

In another example, primary stair-like steps approximately corresponding to the external appearance of the electrode assembly may be formed at the receiving part of the battery case, for example, by molding and then a vacuum may be applied into the battery case to form secondary stair-like steps, thereby completing the stair-like steps. This process has an effect of preventing damage to the battery case due to excessive deformation of the battery case during the vacuum application and easily forming the stair-like steps even in a case in which the thickness of the battery case is large.

Meanwhile, when the receiving part of the battery case is deformed to form the stair-like steps, the stair-like steps are formed by pressing the receiving part of the battery case using a stair-like press member having a structure corresponding to the external appearance of the electrode assembly and then, or at the same time, applying a vacuum into the battery case to form the stair-like steps. In a case in which the stair-like press member is used in the process of forming the stair-like steps, it is possible to reduce a defect rate during formation of the stair-like steps and to more accurately form the stair-like steps.

The battery cell may be a lithium ion battery cell or a lithium ion polymer battery cell; however, the present invention is not limited thereto.

The battery cells according to the present invention may be manufactured using various manufacturing methods.

A first manufacturing method may include manufacturing a battery case having a receiving part to receive an electrode assembly, stacking a plurality of electrodes or unit cells including two or more electrodes or unit cells having different planar sizes in a height direction on the basis of a plane to manufacture an electrode assembly, sequentially stacking sheet type cathodes, sheet type separators, and sheet type anodes such that the sheet type separators are disposed respectively between the sheet type cathodes and the sheet type anodes and winding one end or the other end of a stack in a clockwise direction or in a counterclockwise direction to manufacture a wound type electrode assembly including two electrode rolls, sequentially stacking sheet type cathodes, sheet type separators, and sheet type anodes such that the sheet type separators are disposed respectively between the sheet type cathodes and the sheet type anodes, winding one end of a stack to manufacture a wound type electrode assembly, and stacking two or more wound type electrode assemblies in a height direction on the basis of a plane to manufacture a composite electrode assembly, or arranging one or more polar bodies selected from a group including a cathode plate, an anode plate, and a stacked type electrode assembly on a sheet type separator and winding or folding the sheet type separator to manufacture a stacked and folded type electrode assembly, placing the electrode assembly in the receiving part of the battery case and sealing an outer circumference of the battery case except one side of the outer circumference, injecting an electrolyte into the battery case through the one side of the outer circumference, which is not sealed, of the battery case to impregnate the electrode assembly with the electrolyte, applying a vacuum through the one side of the outer circumference, which is not sealed, of the battery case to remove a surplus space defined between the battery case and the electrode assembly, and sealing the battery case.

A second manufacturing method may include manufacturing a battery case having a receiving part to receive an electrode assembly, stacking a plurality of electrodes or unit cells including two or more electrodes or unit cells having different planar sizes in a height direction on the basis of a plane to manufacture an electrode assembly, sequentially stacking sheet type cathodes, sheet type separators, and sheet type anodes such that the sheet type separators are disposed respectively between the sheet type cathodes and the sheet type anodes and winding one end or the other end of a stack in a clockwise direction or in a counterclockwise direction to manufacture a wound type electrode assembly including two electrode rolls, sequentially stacking sheet type cathodes, sheet type separators, and sheet type anodes such that the sheet type separators are disposed respectively between the sheet type cathodes and the sheet type anodes, winding one end of a stack to manufacture a wound type electrode assembly, and stacking two or more wound type electrode assemblies in a height direction on the basis of a plane to manufacture a composite electrode assembly, or arranging one or more polar bodies selected from a group including a cathode plate, an anode plate, and a stacked type electrode assembly on a sheet type separator and winding or folding the sheet type separator to manufacture a stacked and folded type electrode assembly, placing the electrode assembly in the receiving part of the battery case and sealing an outer circumference of the battery case except one side of the outer circumference, applying a vacuum through the one side of the outer circumference, which is not sealed, of the battery case to remove a surplus space defined between the battery case and the electrode assembly, injecting an electrolyte into the battery case through the one side of the outer circumference, which is not sealed, of the battery case to impregnate the electrode assembly with the electrolyte, and sealing the battery case.

The above battery cell manufacturing methods may further include charging and discharging the battery cell once or more to activate the battery cell and removing gas generated during activation of the battery cell, wherein the step of charging and discharging the battery cell and the step of removing gas may be performed after the step of impregnating the electrode assembly with the electrolyte.

For reference, a lithium secondary battery uses lithium transition metal oxide, such as $LiCoO_2$, as a cathode active material, and carbon as an anode active material. Polyolefin-based porous separators are disposed between anodes and cathodes and a non-aqueous electrolyte including lithium salt, such as $LiPF_6$, is injected into the lithium secondary battery. In this way, the lithium secondary battery is manufactured. During the charge of the lithium secondary battery, lithium ions are discharged from the cathode active material and inserted into a carbon layer of the anode. During the discharge of the lithium secondary battery, on the other hand, lithium ions are discharged from the carbon layer of the anode and inserted into the cathode active material. At this time, the non-aqueous electrolyte serves as a medium to move the lithium ions between the respective anodes and cathodes. It is necessary for the lithium secondary battery to be basically stable within the operating voltage range of the battery and exhibit a performance to transfer ions at a sufficiently high speed.

However, the electrolyte is decomposed at the surface of the anode active material, during the continuous charge and discharge of the battery, with the result that gas is generated. In the initial charge and discharge of the battery, a solid electrolyte interface (SEI) film is formed at the surface of the anode active material to restrain further generation of gas. Consequently, the battery cell activation process is necessary to form the SEI film, which is required before the completion of the battery.

At this time, the step of applying the vacuum into the receiving part to remove the surplus space defined between the battery case and the electrode assembly and the step of removing gas may be simultaneously performed. That is, the vacuum may be applied into the receiving part to remove gas generated during the battery cell activation process and, at the same time, to deform the receiving part of the battery case such that the stair-like steps are formed at the receiving part of the battery case. Consequently, the step of forming the stair-like steps at the receiving part of the battery case may be easily performed using an existing process without the use of additional equipment.

In addition, the step of applying the vacuum through the one side of the outer circumference, which is not sealed, of the battery case to remove the surplus space defined between the battery case and the electrode assembly may include pressing the receiving part of the battery case using a stair-like press member having a structure corresponding to the external appearance of the electrode assembly and then, or at the same time, applying a vacuum into the battery case to form the stair-like steps at the receiving part of the battery case. Since the stair-like press member is used during formation of the stair-like steps, it is possible to more accurately form the stair-like steps.

In accordance with another aspect of the present invention, there is provided a device including the battery cell with the above-stated construction as a power source. The device may be selected from among a mobile phone, a portable computer, a smartphone, a tablet personal computer (PC), a smart pad, a netbook computer, a light electric vehicle (LEV), an electric vehicle, a hybrid electric vehicle, a plug-in hybrid electric vehicle, and a power storage device.

In accordance with a further aspect of the present invention, there is provided a battery pack including the battery cell with the above-stated construction as a unit battery, wherein the battery cell includes two or more battery cells. That is, there is provided a battery pack configured to have a structure in which two or more battery cells, as unit batteries, are connected in series and/or parallel to each other. The battery pack may be used in a device selected from among a mobile phone, a portable computer, a smartphone, a tablet PC, a smart pad, a netbook computer, an LEV, an electric vehicle, a hybrid electric vehicle, a plug-in hybrid electric vehicle, and a power storage device.

The structure of the device and a method of manufacturing the device are well known in the art to which the present invention pertains, and therefore, a detailed description thereof will be omitted.

Advantageous Effects

As is apparent from the above description, the battery cell according to the present invention has stair-like steps. Consequently, it is possible to easily secure a battery cell installation space of a device, to maximize utilization of the inner space of the device. Furthermore, a battery cell having a large capacity may be used in the device and the size of the device may be further decreased.

In addition, it is possible to easily manufacture a desired battery cell due to structural characteristics of the electrode assembly and the battery case irrespective of design change.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
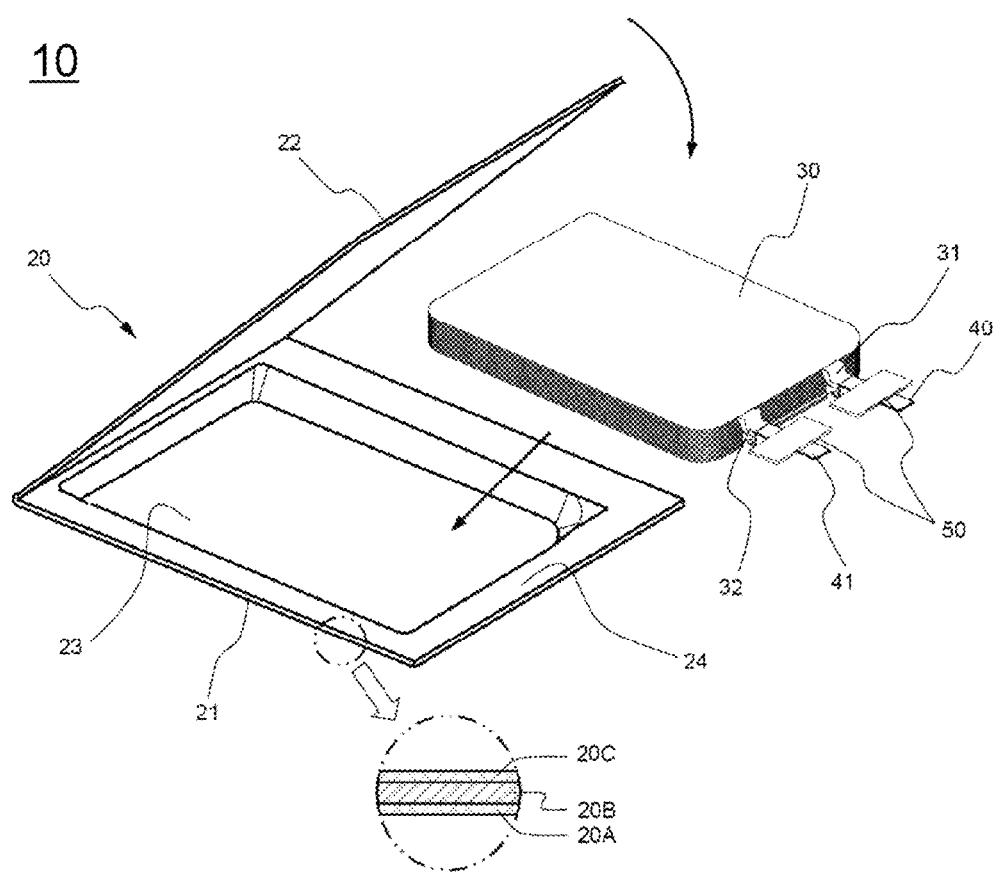
FIG. 1 is a perspective view showing a conventional battery cell.
Figure 2:
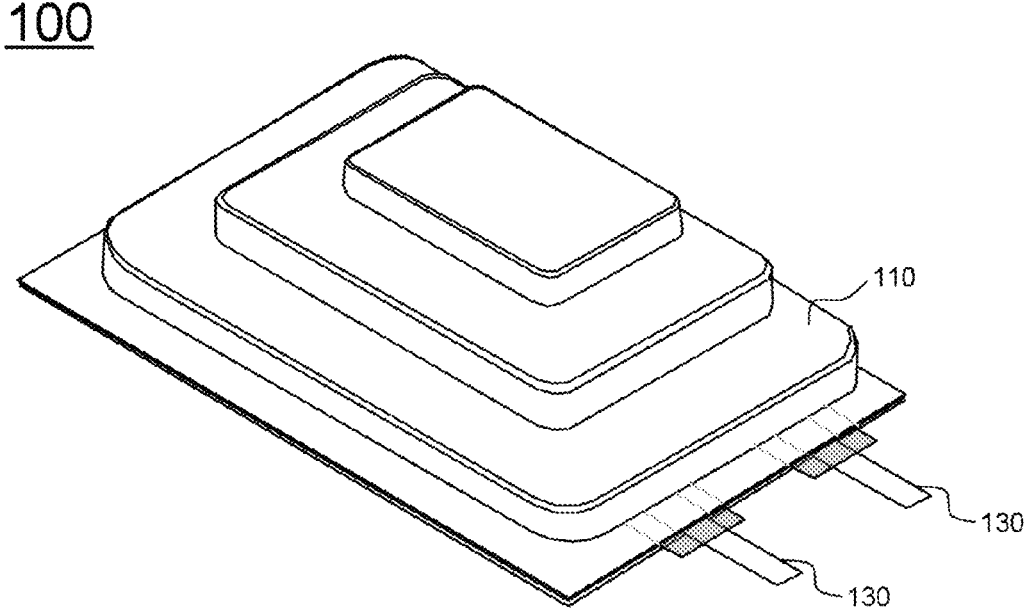
FIG. 2 is a plan view showing a battery cell according to an embodiment of the present invention.
Figure 3:
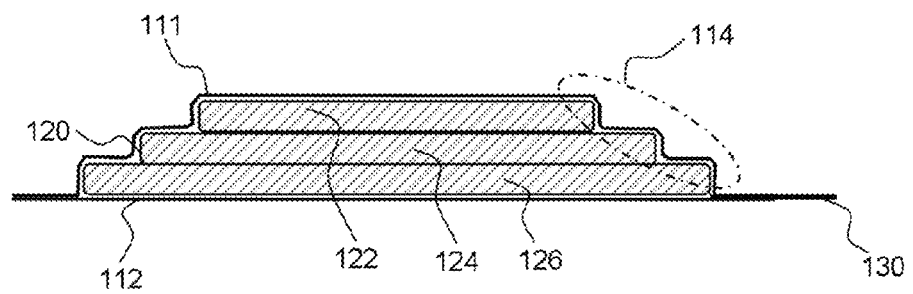
FIG. 3 is a vertical sectional view of FIG. 2.

FIG. 2 is a plan view showing a battery cell according to an embodiment of the present invention and FIG. 3 is a vertical sectional view of FIG. 2.

Referring to FIGS. 2 and 3, a battery cell 100 is configured to have a structure in which an electrode assembly 120 is mounted in a pouch-shaped battery case 110 formed of a laminate sheet and electrode leads 130 electrically connected to the electrode assembly 120 protrude outward from the battery case 110. The battery case 110 includes an upper case 111 and a lower case 112. The upper case 111 is provided with a receiving part 116, in which the electrode assembly 120 is mounted.

The electrode assembly 120 is configured to have a structure in which a plurality of unit cells 122, 124, and 126 having different sizes is stacked in the height direction on the basis of a plane. The receiving part of the battery case 110 is configured to have a structure in which stair-like steps are formed so as to correspond to the external shape of the stacked structure of the unit cells 122, 124, and 126.

The battery cell 100 having the above structure may be manufactured to have various capacities and sizes. In addition, the battery cell 100 having the above structure may be easily mounted in a space, in which it is difficult for a conventional battery cell to be mounted. Furthermore, the battery cell 100 having the above structure may be mounted in a limited space while having a larger capacity depending upon the internal structure of a device. Consequently, it is possible to maximize the use of the internal structure of the device.

Figure 4:
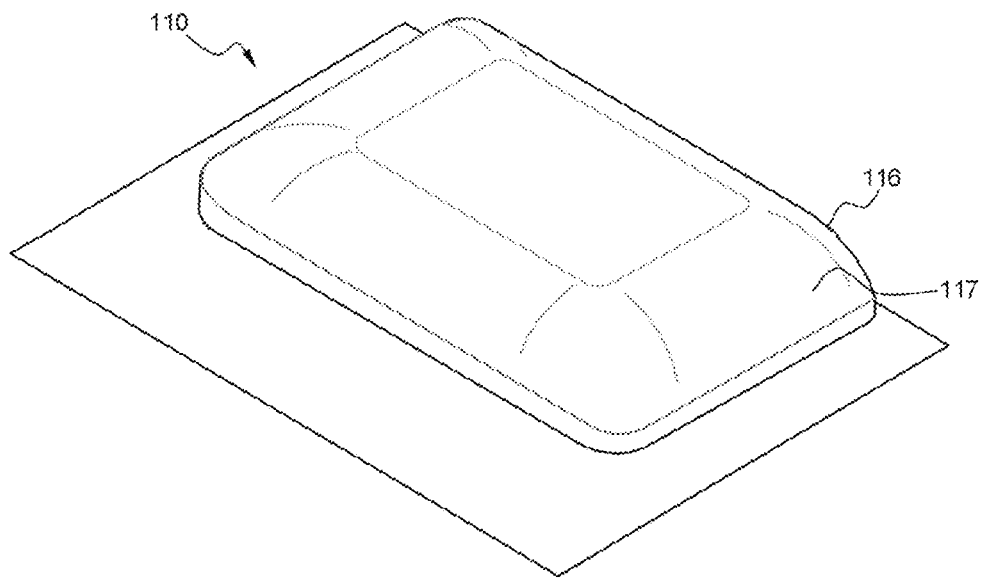
FIG. 4 is a perspective view showing a battery case having a receiving part.
Figure 5:
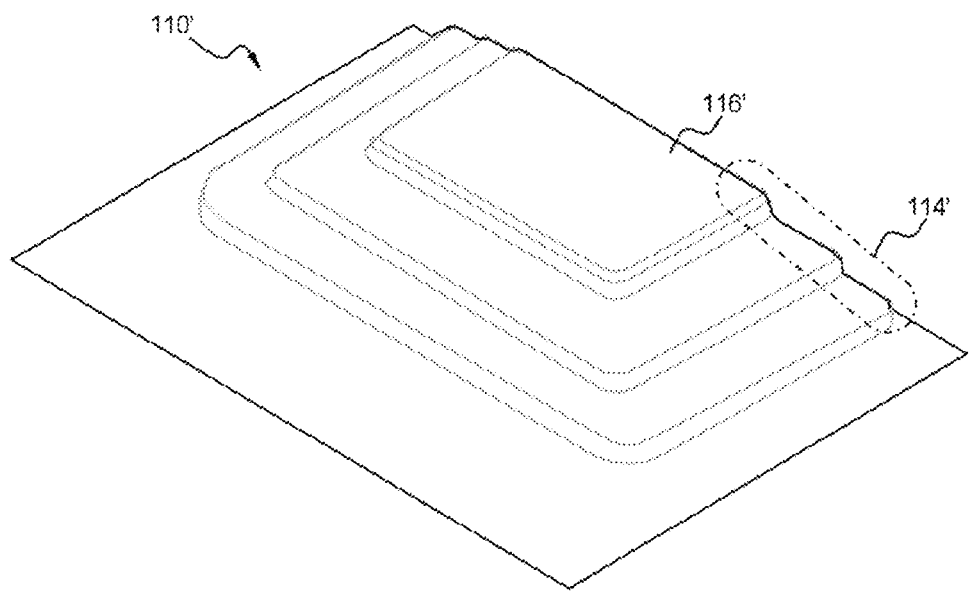
FIG. 5 is a perspective view of a battery case showing that primary stair-like steps are formed at a receiving part of the battery case by molding.
Figure 6:
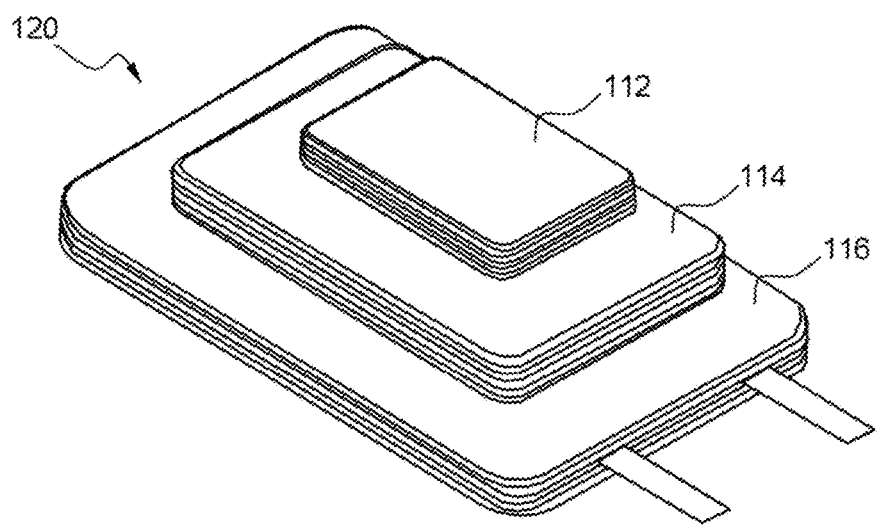
FIG. 6 is a perspective view showing an electrode assembly configured to have a structure in which unit cells having different sizes are stacked.

FIG. 4 is a perspective view showing a battery case having a receiving part, FIG. 5 is a perspective view of a battery case showing that primary stair-like steps are formed at a receiving part of the battery case by molding, and FIG. 6 is a perspective view showing an electrode assembly configured to have a structure in which unit cells having different sizes are stacked.

Referring first to FIGS. 4 and 6, the electrode assembly 120 is configured to have a structure in which the unit cells 122, 124, and 126 are stacked such that the sizes of the unit cells 122, 124, and 126 are decreased from the lower part to the upper part of the electrode assembly 120. The receiving part 116 of the battery case 110 has a sufficient size to receive the electrode assembly 120 including the stacked unit cells 122, 124, and 126. The receiving part 116 has a curved portion 117, at which steps are to be formed. That is, the receiving part 116 is formed in a hemispherical shape while a planar portion corresponding to the size of the upper end of the electrode assembly 120 is formed at the upper end of the receiving part 116.

Referring to FIGS. 5 and 6, a receiving part 116' of a battery case 110' has stair-like steps 114' approximately corresponding to the external appearance of the electrode assembly. The stair-like steps 114' are formed by molding. The stair-like steps 114' of the battery case 110' are of a sufficient size to receive the electrode assembly 120. During a subsequent vacuum application process, a surplus space is removed, and therefore, the stair-like steps are formed in more tight contact with the electrode assembly 120.

Figure 7:
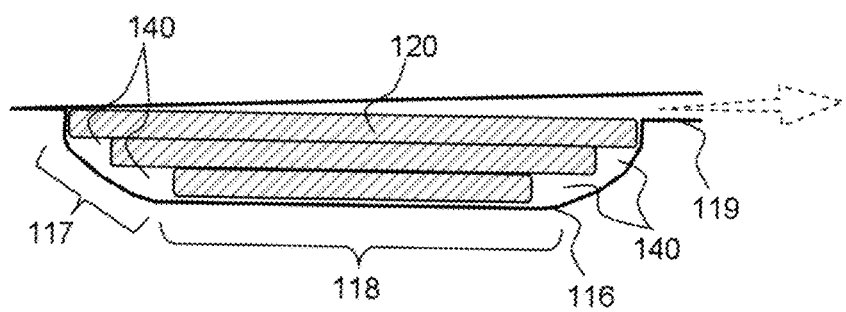
FIGS. 7 to 9 are typical views showing a process of deforming the receiving part of the battery case.
Figure 8:
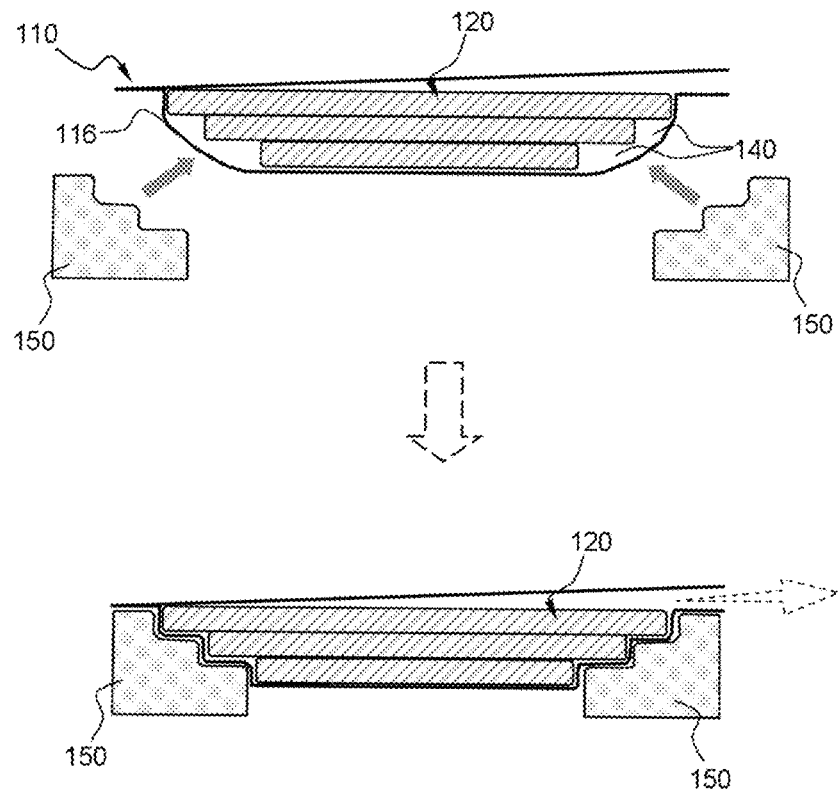
Figure 9:
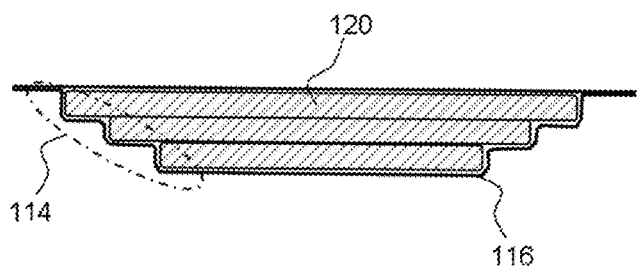

FIGS. 7 to 9 are typical views showing a process of deforming the receiving part of the battery case.

Referring to FIGS. 6 and 7 together with FIGS. 4 and 6, the electrode assembly 120 is mounted in the receiving part 116 of the battery case 110 and an outer circumference 119 of the battery case 110 is sealed by thermal welding except one side of the outer circumference 119. Subsequently, a vacuum is applied through the one side of the outer circumference 119, which is not sealed, of the battery case 110 to remove a surplus space 140 defined between the receiving part 116 of the battery case 110 and the electrode assembly 120. During application of the vacuum, the curved portion 117 of the receiving part 116 comes into contact with the electrode assembly 120. As a result, stair-like steps 114 are formed at the receiving part 116 such that the stair-like steps 114 correspond to the external appearance of a stack constituted by the unit cells having different sizes.

The receiving part 116 of the battery case 110 includes a planar portion 118 corresponding to the size of the unit cell located at the upper part of the electrode assembly 120 and the curved portion 117, at which the stair-like steps 114 are formed.

Meanwhile, during manufacture of the battery cell 100, processes of placing the electrode assembly 120 in the battery case 110, injecting an electrolyte into the battery case 110 to impregnate the electrode assembly 120 with the electrolyte, charging and discharging the battery cell 100 once or more to activate the battery cell 100, and removing gas generated during activation of the battery cell 100 may be included. The process of removing the gas and the process of applying the vacuum into the receiving part 116 to remove the surplus space 140 between the battery case 110 and the electrode assembly 120 and to form the stair-like steps 114 may be simultaneously carried out to improve manufacturing efficiency.

Meanwhile, FIG. 8 shows a process of forming stair-like steps using a stair-like press member.

Referring to FIG. 8 together with FIG. 9, when a vacuum is applied through one side of the outer circumference 119, which is not sealed, of the battery case 110 to remove the surplus space 140 defined between the receiving part 116 of the battery case 110 and the electrode assembly 120, the receiving part 116 of the battery case 110 is pressed using a stair-like press member having a structure corresponding to the external appearance of the electrode assembly 120. After that or at the same time, a vacuum is applied into the battery case 110 to form the stair-like steps 114. Since the stair-like press member is used during formation of the stair-like steps 114, it is possible to more accurately form the stair-like steps 114.

Figure 10:
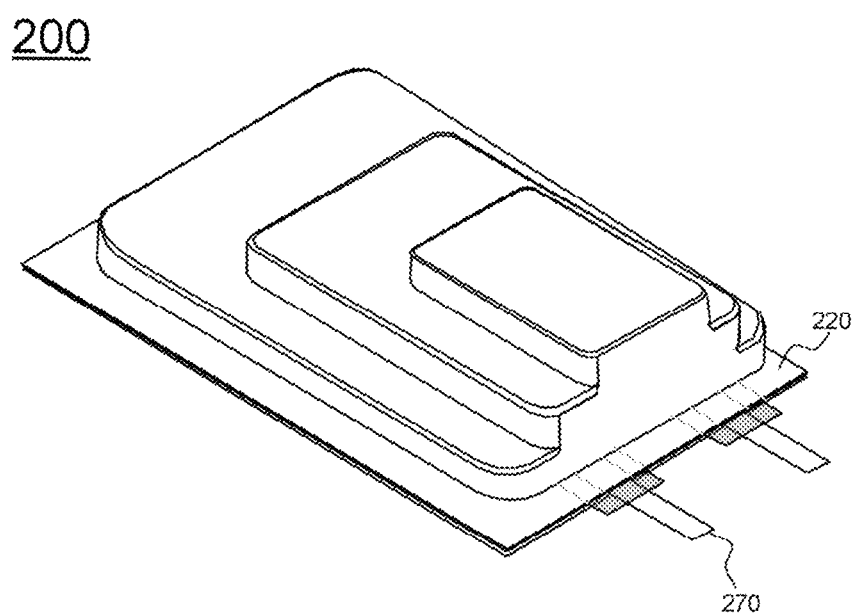
FIG. 10 is a perspective view showing a battery cell according to another embodiment of the present invention.
Figure 11:
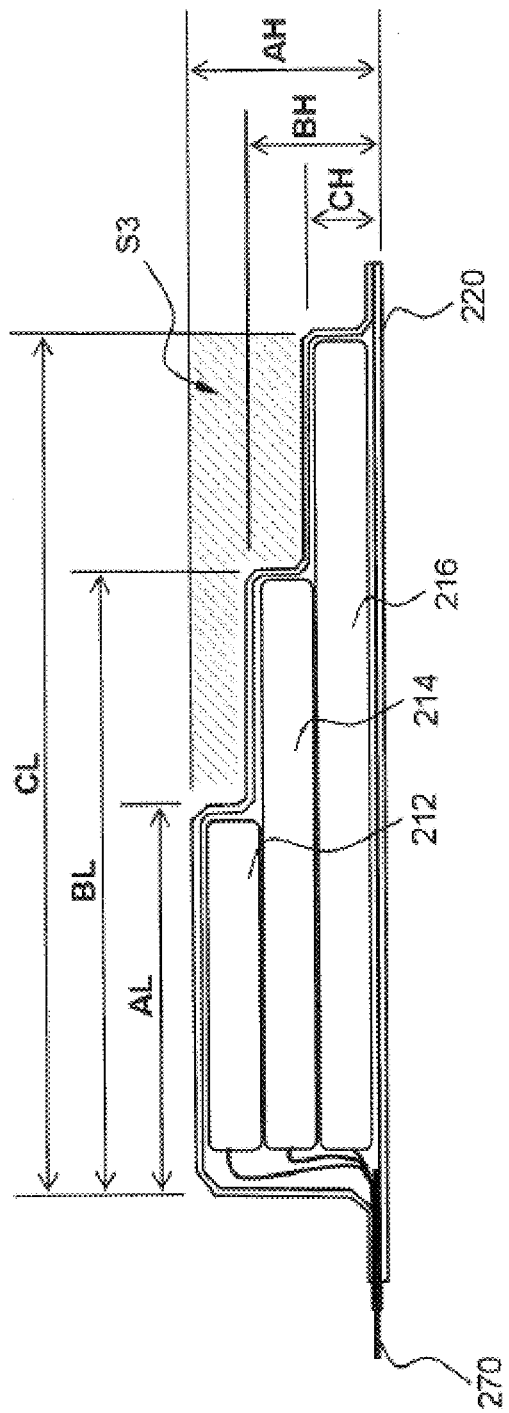
FIG. 11 is a vertical sectional view of FIG. 10.

FIG. 10 is a perspective view showing a battery cell according to another embodiment of the present invention and FIG. 11 is a vertical sectional view of FIG. 10.

Referring to FIGS. 10 and 11, a battery cell 200 is configured to have a structure in which electrode assemblies 212, 214, and 216 having different lengths AL, BL, and CL and different capacities are mounted in a battery case 220 while being vertically stacked. In addition, the vertical stack is configured to have a structure in which the thickness of the vertical stack is increased toward electrode terminals 270 protruding outward from the battery case 220.

Meanwhile, the capacities of the electrode assemblies 212, 214, and 216 are proportional to the products of the lengths AL, BL, and CL, heights AH-BH, BH-CH, and CH, and widths (not shown) of the electrode assemblies 212, 214, and 216.

In the above specific structure of the battery cell 200, a margin space S3 is formed at the right upper end of the stack constituted by the electrode assemblies 212, 214, and 216 having different sizes. The margin space S3 is inversely proportional to the lengths, the heights, and the widths of the electrode assemblies 212, 214, and 216.

The above space is provided to cope with various conditions, such as an irregular inner space of a device, to which the battery cell 200 is applied, or interference with other parts of the device. In addition, a thickness increasing direction and an increasing degree of stack thickness may be flexibly changed according to circumferences or situations.

Figure 12:
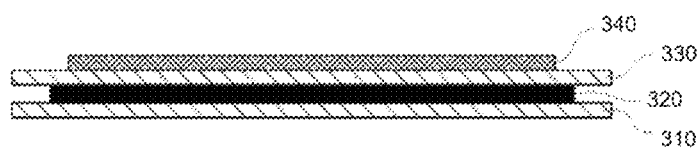
FIG. 12 is a view showing the structure of a first electrode group according to an embodiment of the present invention.

As shown in FIG. 12, a first electrode group is configured to have a structure in which a separator plate 310, a cathode plate 320, a separator plate 330, and an anode plate 340 are laminated while being sequentially stacked.

Figure 13:
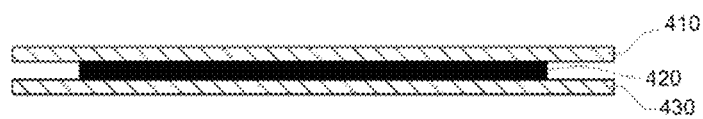
FIG. 13 is a view showing the structure of a second electrode group according to an embodiment of the present invention.

As shown in FIG. 13, a second electrode group is configured to have a structure in which a separator plate 410, an anode plate 420, and a separator plate 430 are laminated while being sequentially stacked.

Figure 14:
FIG. 14 is a typical view showing a stacked type electrode assembly according to an embodiment of the present invention.

FIG. 14 shows a stacked type electrode assembly configured to have a structure in which the second electrode group of FIG. 13 is stacked on the uppermost end of a first electrode group stack constituted by first electrode groups, one of which is shown in FIG. 12.

Figure 15:
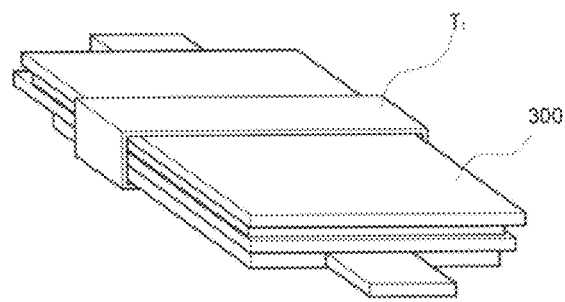
FIG. 15 is a typical view showing a fixing structure of the first electrode group of FIG. 12.
Figure 15:
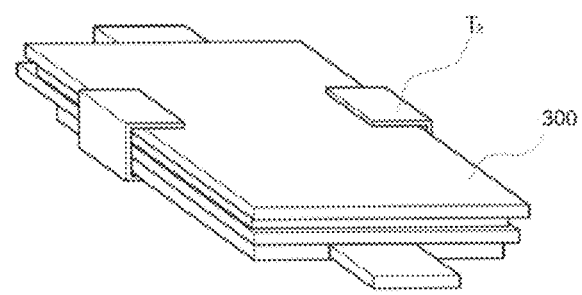

FIG. 15 shows an embodiment in which a fixing member $T_1$ is added to the first electrode group of FIG. 12. Specifically, the fixing member $T_1$ is added to the side or the front of the first electrode group 300.

In order to secure stack stability of a simple stack structure, an additional fixing member may be added to the side of the stack structure to fix the stack structure. The fixing member may be realized as a tape $T_1$ surrounding the entire surface of the first electrode group 300 as shown in FIG. 15(*a*). Alternatively, the fixing member may be realized as a fixing member $T_2$ to fix only each side of the electrode group 300 as shown in FIG. 15(*b*).

Figure 16:
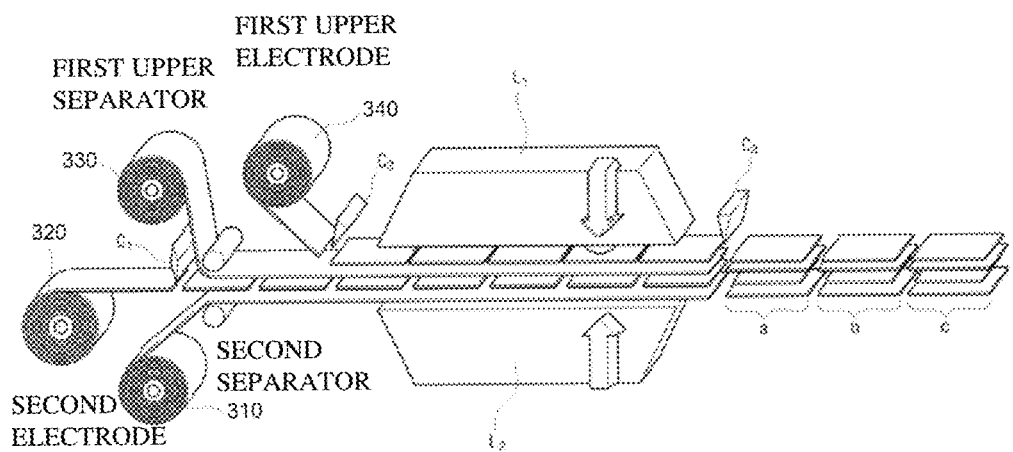
FIG. 16 is a view showing a process of manufacturing a first electrode group according to an embodiment of the present invention.

FIG. 16 is a view typically showing a process of manufacturing the first electrode group according to the present invention.

As shown in FIG. 16, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$. Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode group. Subsequently, a cutter $C_3$ cuts the structural body into a plurality of first electrode groups. Afterwards, various inspection processes, such as a thickness inspection (a), a vision inspection (b), and a short circuit inspection (c), may be performed with respect to each first electrode group.

Subsequently, each first electrode group manufactured as described above is fixed using a fixing member, and the first electrode groups are stacked to constitute a structural body in which the first electrode groups are stacked. Subsequently, the second electrode group shown in FIG. 13 is stacked on the structural body and then the second electrode group and the structural body are fixed using a fixing member, thereby completing a stacked type electrode assembly.

Figure 17:
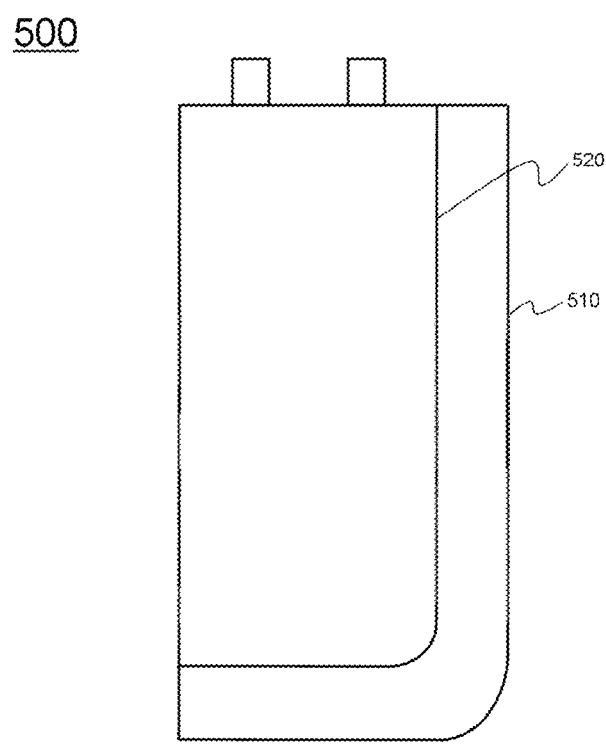
FIG. 17 is a typical view showing an electrode assembly configured to have a structure in which electrode groups having different sizes are stacked.

FIG. 17 is a typical view showing an electrode assembly 500 configured to have a structure in which electrode groups having different sizes are stacked. Referring to FIG. 17, a first electrode group 510 has a larger size in plane than a second electrode group 520. The second electrode group 520 is stacked on the first electrode group 510 to form stair-like steps.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a battery cell having stair-like steps, the method comprising:
   manufacturing a battery case having a receiving part to receive an electrode assembly;
   stacking a plurality of electrodes or unit cells comprising two or more electrodes or unit cells having different planar sizes in a height direction on the basis of a plane to manufacture an electrode assembly;
   placing the electrode assembly in the receiving part of the battery case and sealing an outer circumference of the battery case except one side of the outer circumference;
   injecting an electrolyte into the battery case through the one side of the outer circumference, which is not sealed, of the battery case to impregnate the electrode assembly with the electrolyte;
   applying a vacuum through the one side of the outer circumference, which is not sealed, of the battery case to remove a surplus space defined between the battery case and the electrode assembly; and
   sealing the battery case.

2. The method according to claim 1, further comprising:
   charging and discharging the battery cell once or more to activate the battery cell; and
   removing gas generated during activation of the battery cell, wherein
   the step of charging and discharging the battery cell and the step of removing gas are performed after the step of impregnating the electrode assembly with the electrolyte.

3. The method according to claim 2, wherein the step of removing gas and the step of applying the vacuum to remove the surplus space defined between the battery case and the electrode assembly are simultaneously performed.

4. The method according to claim 1, wherein the step of applying the vacuum through the one side of the outer circumference, which is not sealed, of the battery case to remove the surplus space defined between the battery case and the electrode assembly comprises pressing the receiving part of the battery case using a stair-like press member having a structure corresponding to an external appearance of the electrode assembly and applying a vacuum into the battery case.

5. A method of manufacturing a battery cell having stair-like steps, the method comprising:
   manufacturing a battery case having a receiving part to receive an electrode assembly;
   stacking a plurality of electrodes or unit cells comprising two or more electrodes or unit cells having different planar sizes in a height direction on the basis of a plane to manufacture an electrode assembly;
   placing the electrode assembly in the receiving part of the battery case and sealing an outer circumference of the battery case except one side of the outer circumference;
   applying a vacuum through the one side of the outer circumference, which is not sealed, of the battery case to remove a surplus space defined between the battery case and the electrode assembly;
   injecting an electrolyte into the battery case through the one side of the outer circumference, which is not sealed, of the battery case to impregnate the electrode assembly with the electrolyte; and
   sealing the battery case.

6. The method according to claim 5, further comprising:
   charging and discharging the battery cell once or more to activate the battery cell; and
   removing gas generated during activation of the battery cell, wherein the step of charging and discharging the battery cell and the step of removing gas are performed after the step of impregnating the electrode assembly with the electrolyte.

7. The method according to claim 6, wherein the step of removing gas and the step of applying the vacuum to remove the surplus space defined between the battery case and the electrode assembly are simultaneously performed.

8. The method according to claim 5, wherein the step of applying the vacuum through the one side of the outer circumference, which is not sealed, of the battery case to remove the surplus space defined between the battery case and the electrode assembly comprises pressing the receiving part of the battery case using a stair-like press member having a structure corresponding to an external appearance of the electrode assembly and applying a vacuum into the battery case.

\* \* \* \* \*